(12) United States Patent
Lin et al.

(10) Patent No.: US 11,176,106 B2
(45) Date of Patent: Nov. 16, 2021

(54) DYNAMIC MODIFICATION OF DATABASE SCHEMA

(71) Applicants: Kung Y Lin, Irvine, CA (US); Johnny Hu, Irvine, CA (US); Alma DeJesus, Irvine, CA (US)

(72) Inventors: Kung Y Lin, Irvine, CA (US); Johnny Hu, Irvine, CA (US); Alma DeJesus, Irvine, CA (US)

(73) Assignee: Unisys Corporation, Blue Bell, PA (US)

( * ) Notice: Subject to any disclaimer, the term of this patent is extended or adjusted under 35 U.S.C. 154(b) by 463 days.

(21) Appl. No.: 14/547,471

(22) Filed: Nov. 19, 2014

(65) Prior Publication Data

US 2016/0140149 A1 May 19, 2016

(51) Int. Cl.
*G06F 16/21* (2019.01)

(52) U.S. Cl.
CPC .................. *G06F 16/213* (2019.01)

(58) Field of Classification Search
USPC ........................................................ 707/803
See application file for complete search history.

(56) References Cited

U.S. PATENT DOCUMENTS

| | | | | |
|---|---|---|---|---|
| 6,339,772 | B1* | 1/2002 | Klein | G06F 17/30492 707/704 |
| 7,222,133 | B1* | 5/2007 | Raipurkar | G06F 11/1458 707/642 |
| 9,021,458 | B1* | 4/2015 | Jacob | G06F 8/65 717/168 |
| 9,372,855 | B1* | 6/2016 | Petts | G06F 16/2308 |
| 9,449,047 | B2* | 9/2016 | Babkin | G06F 17/30516 |
| 10,268,709 | B1* | 4/2019 | Suehs | G06F 16/211 |
| 2002/0133507 | A1* | 9/2002 | Holenstein | G06F 11/2064 |
| 2003/0084038 | A1* | 5/2003 | Balogh | G06F 9/505 |
| 2005/0097149 | A1* | 5/2005 | Vaitzblit | G06F 21/6227 |
| 2011/0113019 | A1* | 5/2011 | Leff | G06F 17/3056 707/695 |
| 2011/0119288 | A1* | 5/2011 | Sinha | G06F 16/217 707/769 |
| 2011/0320474 | A1* | 12/2011 | Chainani | G06F 16/2329 707/769 |
| 2012/0023080 | A1* | 1/2012 | Bolohan | G06F 16/219 707/705 |
| 2012/0166492 | A1* | 6/2012 | Bikkula | G06F 17/30584 707/803 |
| 2012/0179663 | A1* | 7/2012 | Haudenschild | G06F 16/2471 707/706 |

(Continued)

*Primary Examiner* — Tamara T Kyle
*Assistant Examiner* — Raheem Hoffler
(74) *Attorney, Agent, or Firm* — Merchant & Gould P.C.

(57) ABSTRACT

Systems and methods are disclosed that perform dynamic database schema modification. A database system may receive a request to change a schema. In response to receiving the request to perform the dynamic schema modification, the database system may complete pending transactions and begin modifying the database schema. Any requests to access the database received prior to completion of the modification may be paused, thereby allowing the database to remain online and continue receiving requests while the modification is in progress. After completion of the modification, the paused requests may be resumed.

19 Claims, 6 Drawing Sheets

(56) References Cited

U.S. PATENT DOCUMENTS

| | | | | |
|---|---|---|---|---|
| 2013/0262399 A1* | 10/2013 | Eker | ................ | G06F 17/30297 |
| | | | | 707/687 |
| 2014/0089253 A1* | 3/2014 | Mansur | ................ | G06F 16/213 |
| | | | | 707/609 |
| 2014/0143284 A1* | 5/2014 | McCaffrey | ............ | G06F 16/213 |
| | | | | 707/803 |
| 2015/0106140 A1* | 4/2015 | Biewald | ................ | G06Q 10/06 |
| | | | | 705/7.12 |
| 2015/0161182 A1* | 6/2015 | Baeuerle | ............. | H04L 67/141 |
| | | | | 707/803 |
| 2015/0193477 A1* | 7/2015 | Dumant | ................ | G06F 16/211 |
| | | | | 707/609 |
| 2015/0220327 A1* | 8/2015 | Poon | ...................... | G06F 16/21 |
| | | | | 717/120 |
| 2015/0363434 A1* | 12/2015 | Cerasaro | ............ | G06F 16/2358 |
| | | | | 707/616 |
| 2016/0098438 A1* | 4/2016 | Eberlein | ............. | G06F 16/2282 |
| | | | | 707/704 |
| 2018/0095952 A1* | 4/2018 | Rehal | ................... | G06F 16/213 |

* cited by examiner

DYNAMIC MODIFICATION OF DATABASE SCHEMA

TECHNICAL FIELD

The present disclosure relates generally to updating a database schema; in particular, the present disclosure relates maintaining the online status of an enterprise database system while updating the database schema.

BACKGROUND

Updating a database schema is a common task for a database administrator. Generally, the process of updating a database schema requires the database to be taken offline and rebuilt. However, taking a database offline can be problematic, particularly when the database is part of an enterprise system that processes requests for many different users both within and outside of the enterprise system. In such environments, taking a database offline for extended periods of time can result in loss of productivity for users and applications that interact with the database. Furthermore, taking a database system offline increases the chance of other errors when restarting the system.

For these and other reasons, improvements are desirable. Although specific problems have been addressed in this Background, this disclosure is not intended in any way to be limited to solving those specific problems.

SUMMARY

In accordance with the following disclosure, the above and other issues are addressed by the following:

In a first aspect, a method for dynamically modifying a database schema is disclosed. The method includes receiving, at a database manager managing a database engine on a computing system, a request to modify the database schema. The method provides for completing any pending transactions on the database, wherein the pending transactions were received prior to the request to dynamically modify the database schema. Upon completion of the pending transactions, the method provides for initiating modification of the database schema based on the received request. A request to access the database received prior to completion of modification of the schema are paused. After completion of the modification, the paused request is resumed.

In a second aspect, a computer storage medium is disclosed that includes computer-executable instructions, which when executed on a computing device perform a method for dynamically modifying a database schema. The method includes receiving a request to dynamically modify the database schema. Upon receiving the request, the method provides for completing any pending transactions on the database wherein the pending transactions were received prior to the request to dynamically modify the database schema. Upon completion of the outstanding requests, the method provides for initiating modification of the database schema based on the received requeset. A request to access the database prior to completion of modifying the database schema are paused. After completion of the modification, the paused request is resumed.

In a third aspect, a system modifying a database schema of a database is disclosed. The system includes a database engine executable on a computing system. The database engine is configured to a request to modify the database schema. Upon receiving the request, the method provides for completing any pending transactions on the database. Upon completion of the pending transactions, the method provides for initiating modification of the database schema based on the received request. Any requests to access the database prior to completion of modification of the schema are paused. After completion of the modification, the paused requests are resumed. Resuming the paused requests may include identifying a target of the request and determining whether the target exists prior to the modification of the schema. If the target exists, the request may be performed. If the target does not exist, the database engine may be configured to generate an alert and sending the alert to the application or device that submitted the request.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

Updating a database schema is a common task for a database administrator. Among other reasons, an update to the schema of a database may be necessitated by changes in the underlying data received by a database system, modifications to related application functionality, and/or changes in a business objective. Generally, the process of updating a database schema requires the database to be taken offline and rebuilt. However, taking a database offline can be problematic, particularly when the database is part of an enterprise system that processes requests for many different users both within and outside of the enterprise system. In such environments, taking a database offline for extended periods of time can result in loss of productivity for users and applications that interact with the database. Furthermore, taking a database system offline increases the chance of other errors when restarting the system.

Embodiments of the present disclosure address these issues by providing a database system capable of dynamically updating the schema of a database while maintaining the online status of the database. In embodiments, during the dynamic modification users and applications can still submit requests to the database system. As such, from the user's perspective the database appears to continue processing requests while the dynamic modification is performed. Among other benefits, the ability to maintain the online status of the database during a schema modification addresses the efficiency issues and reduces the chance of encountering other errors while the system is offline and/or in the process of restarting.

Figure 1:
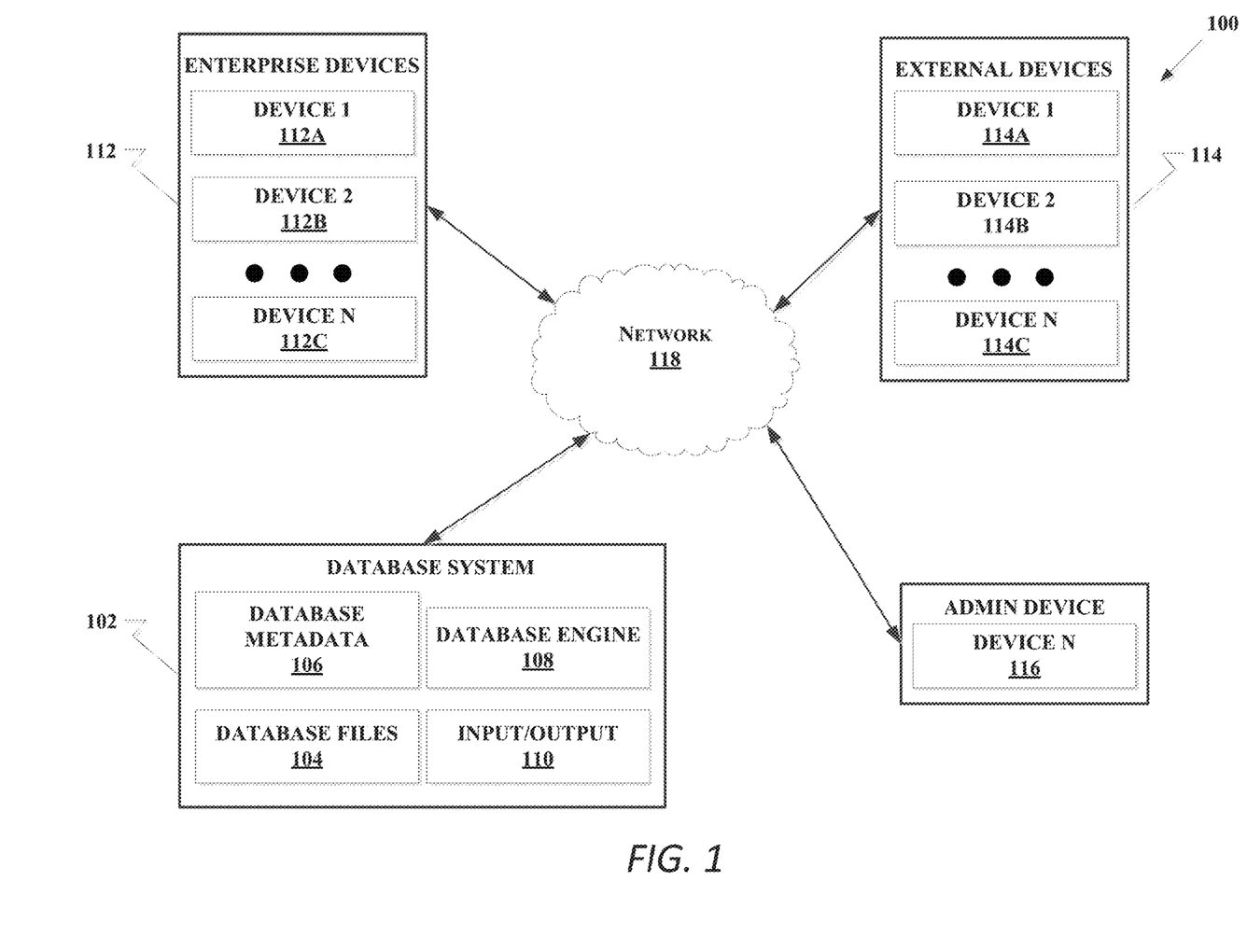
FIG. 1 is a block diagram illustrating an example embodiment of a system for performing dynamic schema modification.

FIG. 1 is a block diagram illustrating an example embodiment of a system 100 for performing dynamic schema modification. In embodiments, a the system 100 for providing database information may include a database system 102 and multiple devices communicating with the database system 102 via one or more communication networks, such as communications network 118. In embodiments, communications network 118 may be any type of wired or wireless network or a combination of a wired and wireless network. Non-limiting examples of such networks include, but are not limited to, a local area network (LAN), a wide area network (WAN), a plain old telephone service (POTS) network, a cellular data network, a satellite data network, a Wi-Fi network, and/or the Internet. In embodiments, database system 102 may be part of an enterprise system. The enterprise system may include multiple enterprise devices 112 that interact with the database system via communications network 118. In embodiments, an enterprise system may include multiple enterprise devices, such as Enterprise Devices 112A-C.

In addition to enterprise devices 112, in further embodiments, database system 110 may also receive requests from external devices 114. External devices may be devices that are not part of an enterprise system; however, they external devices are also capable of submitting requests to database system 102 via communications network 118. While FIG. 1 illustrates a single communications network 118 connecting database system 102, enterprise devices 112, and external devices 114, one of skill in the art will appreciate that multiple networks may be employed with the embodiments disclosed herein. For example, in embodiments where database system 102 and enterprise devices 112 are part of a single enterprise, they may communicate via a private network such set up, for example, as a LAN or a WAN. On the other hand, external devices 114 may communicate with the database system via a public network, such as the Internet.

The database system 102 may include database files 104. The database files 104 may include tables or objects that are normally stored by relational or object databases. The database files 102 make up the database resources that various applications, such as, for example, applications residing on enterprise devices 112 and/or external devices 114, may request access to in order to read or write information. In embodiments, the structure of the database files 104 may be defined by one or more database schemas. As used herein, a database schema may refer to the structure of a database system and its various components (e.g., files, tables, objects, etc.). In embodiments, the schemas may be described by a formal language, such as a data definition language. Exemplary data definition languages include, but are not limited to, the Structured Query Language (SQL) and the Data and Structure Definition Language (DASDL). In example embodiments, the database system 102 can represent any of a variety of types of database management systems; in an example embodiment, the database system 102 can correspond to the DMSII database management system provided by Unisys Corporation of Blue Bell, Pa.

In embodiments, database system 102 may also include database metadata 106. Database metadata may include information about the database and its files. Exemplary metadata may include, but is not limited to, database configuration files and database catalog files. In embodiments, the database metadata 106 comprises definitions for database objects such as table, view, indexes, users, user groups, etc. In embodiments, the database metadata 106 also comprises information related to a database schema.

The database system 102 may include a database engine 108. In embodiments, the database engine 108 may perform database related tasks. For example, the database engine 108 may determine which applications are allowed to access and/or modify database resources. For example, database engine 108 may process requests received by the Input/Output component 110 from communications network 118. In embodiments, processing the requests may include making processing database transactions to add or remove data from the database, creating views, returning data from the database, etc. In further embodiments, the database engine 108 may also perform the dynamic modification of database schemas. Upon receiving a request to modify the database schema, the database engine 108 may pause any requests received to modify or otherwise access the database, recompile the database to incorporate the schema modifications, and then resume processing the received requests. In this manner, the database system 102 appears to remain online to enterprise devices 112 and external devices 114 because they can still submit requests to database system 102. Dynamic modification of the database schema by the database engine 108 is described in further detail with respect to FIG. 4.

In embodiments, the system 100 may also include at least one admin device 116. In embodiments, the admin device 116 may provide an interface to receive database schema modifications from a database administrator. Admin device 116 may submit the schema modifications along with a request for dynamic modification of the schema to the database system 102. In alternate embodiments, admin device 116 may submit a request to perform manual modification of the database schema. In such embodiments, a database administrator may have more control over how and when the database schema is modified. Exemplary tasks that may be performed by the admin device 116 is described in further detail with respect to FIG. 3.

Figure 2:
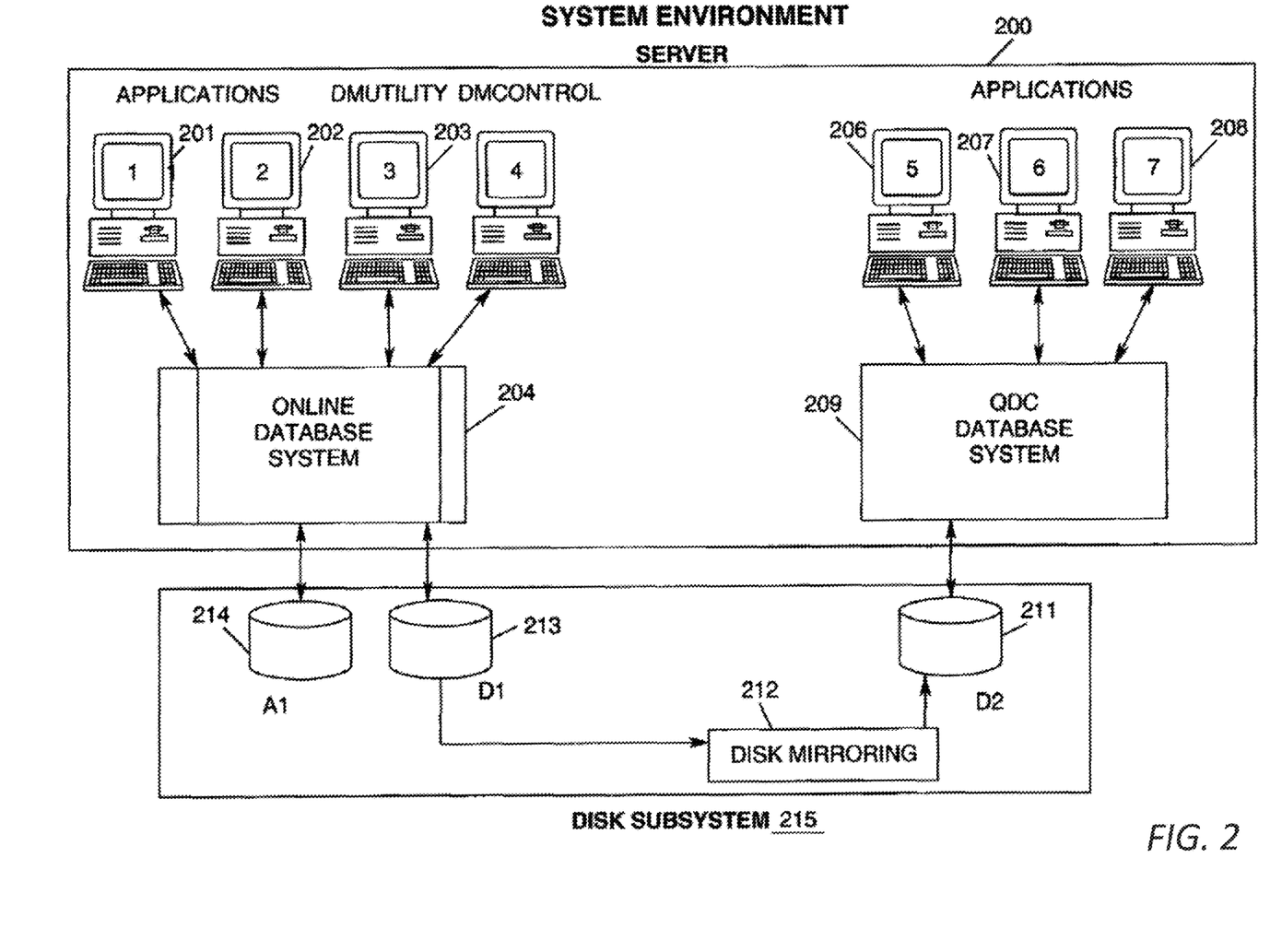
FIG. 2 is a drawing of an embodiment of a system environment showing a server connected to a disk subsystem.

FIG. 2 is an illustration of an embodiment of a system environment. The server 200 is used to run several different applications and utilizes the personal computer client-users 201, 202, and 203, which interact with and access the database system 204 within the server 200. Users, in this context, can include administrative users managing database structure and permissions, as well as applications which interact with the database. The server also utilizes the PC client-users 206, 207 and 208, which interact with and access the database system 209 (shown in this embodiment as QDC database system) within the single server 200.

Within the disk subsystem 215, the data files contained in the disk 213 (D1) are communicated back and forth with the primary online database system 204, and also optionally sent via the disk mirroring system 212 to disk (D2), 211. Disk (D2) 211, contains the mirrored database snapshot.

The data files of database system 204 are mirrored via system 212 and communicated to the secondary database system 209.

Although in this example system environment the server contains two separate database systems 204, 209, it is recognized that in the context of the present disclosure, only one database system may be present. Additionally, mirroring among disks 211, 213 may or may not occur in certain embodiments.

Figure 3:
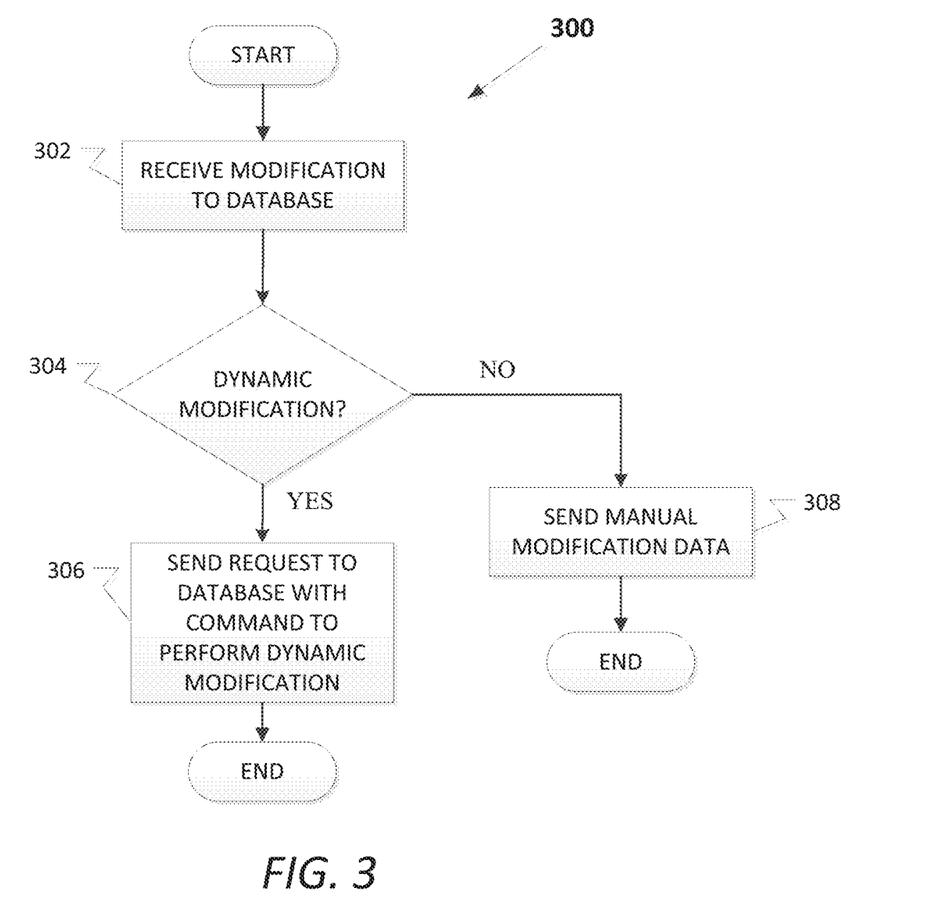
FIG. 3 is a flow diagram illustrating an embodiment of a method for requesting a dynamic schema modification.

FIG. 3 is a flow diagram illustrating an embodiment of a method 300 for requesting a dynamic schema modification. In embodiments, the method 300 may be performed by an application or process executing on a device, such as an admin device 116 (FIG. 1). In other embodiments, the method 300 may be performed by an application that is part of a database system, such as database system 102 (FIG. 1). Flow begins at operation 302 where a request to modify the schema of a database is received. In embodiments, receiving the request to modify the schema may include receiving the actual schema modifications. The schema modifications may be in the form of a data definition language that represents a new schema or modifications to an existing schema. In one embodiment, the modifications may be in the form of an addition or deletion of a disjoint set or one or more disjoint sets of data and/or any related spanning sets or subsets of the disjoint set of data. A disjoint set of data may be a table in a relational database. In alternate embodiments, a disjoint set of data may be an object in an object oriented database. In additional embodiments, operation 302 may also receive commands to modify the database schema. In embodiments, the commands may indicate that the modifications are to be made dynamically or manually.

Flow continues to decision operation 304 where the method 300 determines whether the modifications should be performed dynamically or manually. In embodiments, the determination may be based off of command, flag, or other indication received at operation 302. In an alternate embodiment, the decision may be based off of user input indicating whether the modifications should be performed dynamically. If the modifications are not to be performed dynamically, flow branches NO to operation 308. At operation 308, manual modification data may be collected. The additional information may be required to perform the manual schema modification. Such information may include, but is not limited to, the schema modifications, an identifier of the database to be modified, database location information (e.g., partition information), etc. The manual modification data may then be sent or otherwise provided to a database system.

Returning to operation 304, if dynamic modification of the schema is to be performed, flow continues to operation 306. At operation 306 the modifications to the schema are sent or otherwise provided to the database system along with a command to perform the modifications dynamically. As such, a request to perform the modification dynamically requires the collection of less information than a manual request, thereby reducing the amount of work required by a database administrator to modify the schema of a database.

Figure 4:
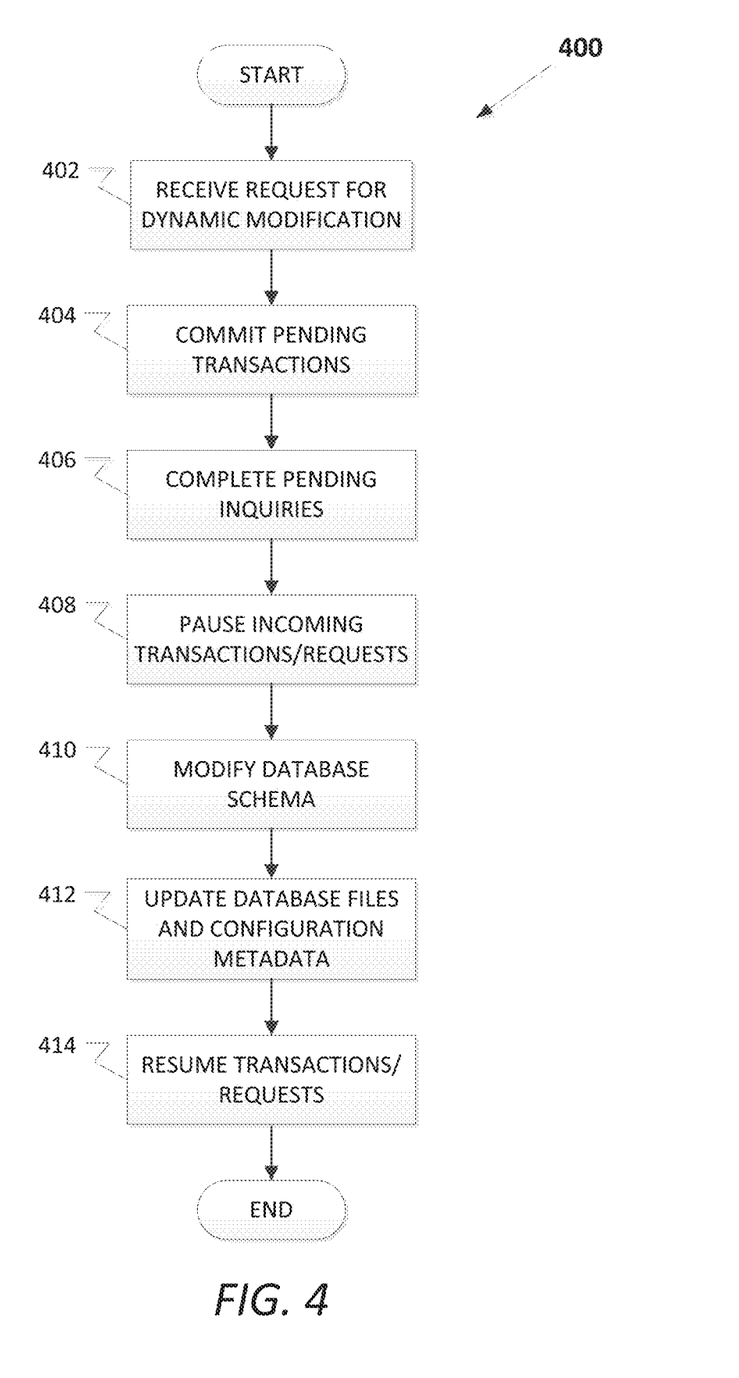
FIG. 4 is a flow diagram illustrating an embodiment of a method for performing dynamic schema modification.

FIG. 4 is a flow diagram illustrating an embodiment of a method 400 for performing dynamic schema modification. In one embodiment, the method 400 may be performed by a database engine that is part of the database system. In an alternate embodiment, the method 400 may be performed by any process, application, or component that is responsible for receiving requests and performing operations on a database. Flow begins at operation 402 where a request to perform a dynamic modification of a database schema is received. As previously discussed, receiving the request to modify the schema may include receiving the actual schema modifications. The schema modifications may be in the form of a data definition language that represents a new schema or modifications to an existing schema. In one embodiment, the modifications may be in the form of an addition or deletion of a disjoint set of one or more disjoint sets of data and/or any related spanning sets or subsets of the disjoint set of data. A disjoint set of data may be a table in a relational database. In alternate embodiments, a disjoint set of data may be an object in an object oriented database.

In embodiments, prior to modifying the database schema, all pending requests submitted to the database are completed. Flow continues to operation 404 where the method performs and commits any pending transactions. Exemplary transactions include create, read, update, and delete requests that were submitted to the database system prior to receiving the request to dynamically modify the database. While specific examples of transactions have been provide herein, one of skill in the art will appreciate that other tasks or transactions may be performed. Flow continues to operation 406 where all pending inquiries are resolved. In embodiments, an inquiry is a request to view or otherwise access data stored in the database. In such embodiments, performing an inquiry may comprise identifying, generating, gathering, and/or sending data from the database to the requesting application, device, and/or user.

Upon completion of all pending transactions and inquiries, flow continues to operation 408. At operation 408, incoming requests received by a database are pause. In embodiments, the database still receives requests to perform transactions, thereby maintaining an online status. However, rather than immediately performing the requests, the requests are paused so the database schema may be modified. In one example, a semaphore may be used to control access to the resource. In such embodiments, the semaphore controls access to the database, and blocking incoming requests from being performed until the schema modification is completed. In other embodiments, locks may be employed to restrict access to the database during schema modification. One or more queues may also be used to queue incoming requests until the schema modification is complete. In such embodiments, incoming requests may be stored in the queue until modification of the database schema is complete. One of skill in the art will appreciate that other mechanisms known to the art may be employed to effectively pause incoming requests without departing from the scope of this disclosure.

While the incoming requests are paused, flow continues to operation 410 where the database schema is modified. In one embodiment, modifying the schema may include recompiling the database with the modifications received at operation 402. In exemplary embodiments, the modifications introduced through changes to the data definition language for the database received at operation 402 are recompiled to add or remove disjoint data sets, related spanning sets, and/or subsets. In the past, recompiling the database would require taking the database offline due to conflicts that occur when a request is received during recompilation. However, embodiments of the present disclosure provide the ability for the database to continue to receive requests during recompilation. The requests are paused to avoid any conflicts during recompilation. However, to users or applications interacting with the database, the database appears to remain online and will continue to accept requests.

After recompiling the database to modify the schema, flow continues to operation 412 where the database files changed by the schema modifications are updated. In embodiments, database elements, such as a table or an object, may be added or removed from the database files at operation 412. Additionally, in embodiments, database metadata, such as configuration information or catalog information, may be updated to reflect the changes in the schema. Upon updating the database files and metadata with the new schema, the dynamic modification of the schema is complete. Flow continues to operation 414 where the paused requests received during operations 410 and 412 are resumed.

Because the database schema was modified, additional checks may be employed to ensure that any requests received during the dynamic modification are still capable of being performed. In cases where only additions have been made to the schema, it may be unnecessary to perform any additional checks. Under such circumstances, any applications or users submitting a request may not have knowledge of the new additions to the schema. As such, it may be the case that none of the paused requests are related to the additions. However, if the modifications resulting in the deletion or removal of elements from the schema, some of the requests may be directed towards data or elements that are no longer present given the schema modifications.

Figure 5:
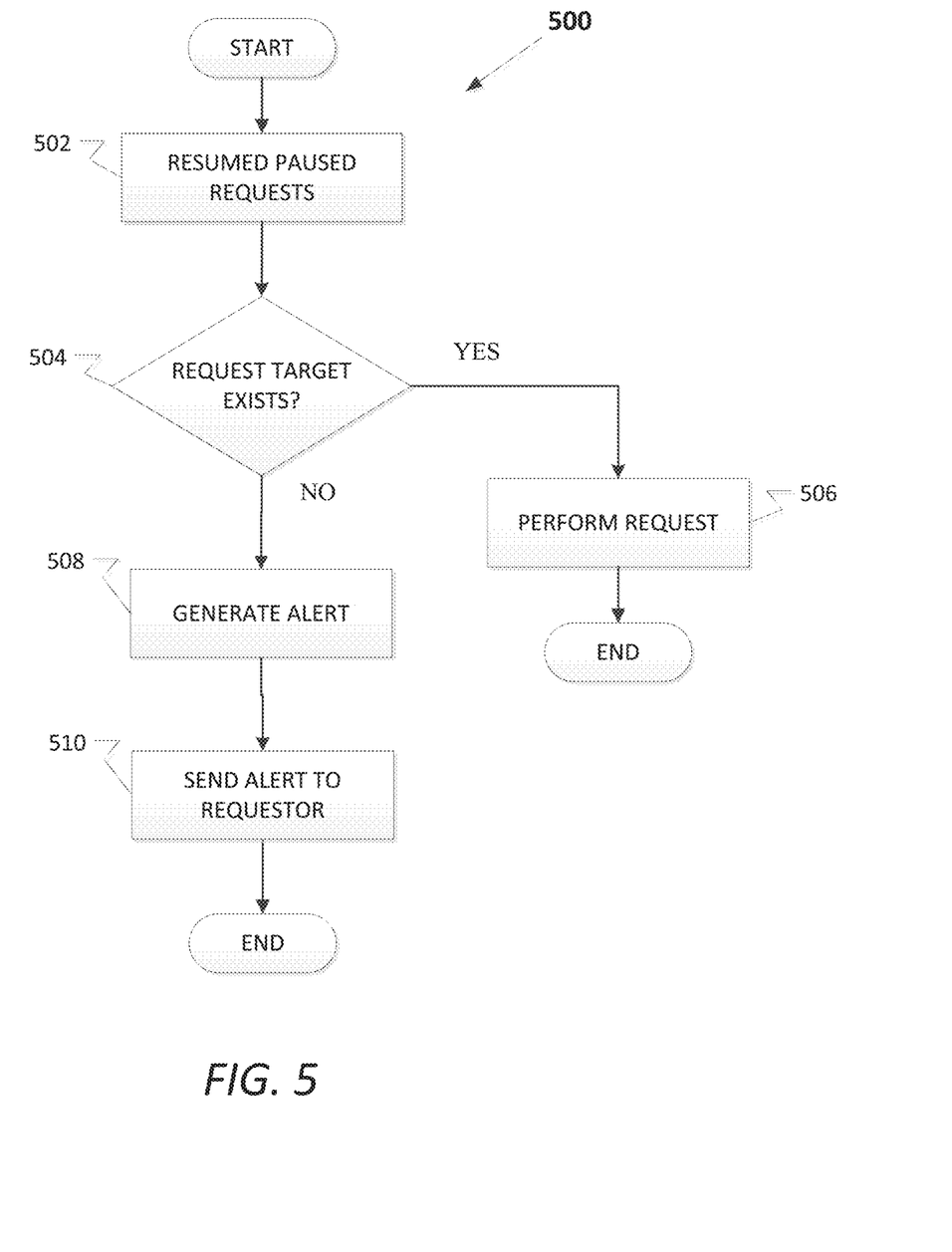
FIG. 5 is a flow diagram illustrating an embodiment of a method for resuming operation after a dynamic schema modification.

FIG. 5 is a flow diagram illustrating an embodiment of a method 500 for resuming operation after a dynamic schema modification. In embodiments, begins at operation 502 where requests that were paused during modification of the schema are resumed. In embodiments, resuming the requests may include removing any semaphores or locks on the database or accessing requests stored in a queue. Flow continues to operation 504 where the method 500 determines if the target of the request exists. As previously discussed, a schema modification that resulted in the removal of data from the schema, such as, for example, the removal of a table from the database, may eliminate targets of requests submitted during the schema modification. In order to avoid errors, prior to processing a paused request, the request may be examined to determine whether the target (e.g., a table or data in a specific table) of the request is directed towards an element that no longer exists.

If the target of pause request exists, flow branches YES to operation 506 and the request is processed normally. If, however, the target of the request no longer exists due to the schema modification, flow branches NO to operation 508. At operation 508, an alert may be generated. In embodiments, the alert may include information to inform a user or an application that the target of the request no longer exists or is no longer valid. In further embodiments, the alert may provide additional information about the updated schema that a user or application may use to generate an updated request. Flow continues to operation 510 where the alert may be sent to the device or application that submitted the request.

Figure 6:
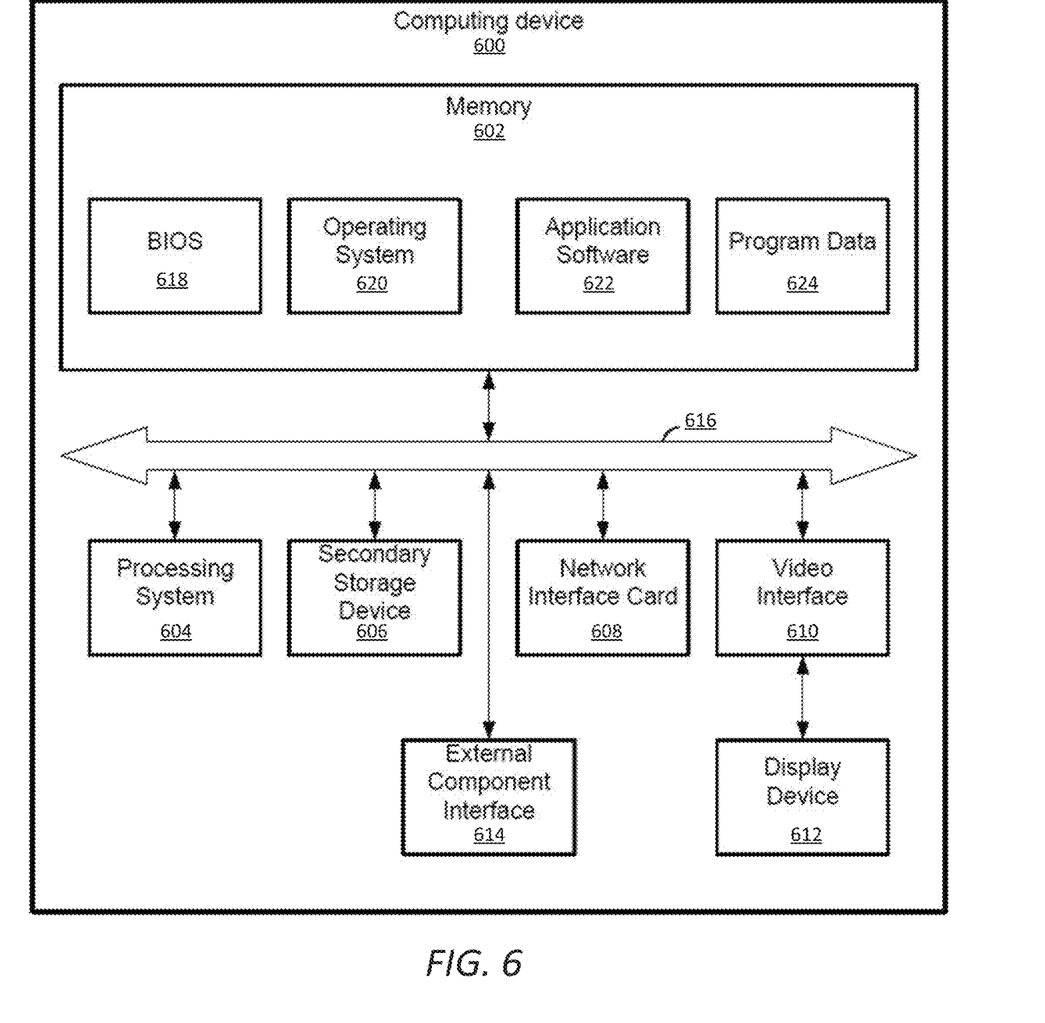
FIG. 6 is a block diagram illustrating example physical details of an electronic computing device, with which aspects of the present disclosure can be implemented.

Having described various embodiments of systems and methods for performing dynamic schema modification, the disclosure will now turn to exemplary operating environments that may be employed to implement the systems and methods disclosed herein. FIG. 6 is a block diagram illustrating an example computing device 600. In some embodiments, the database system 102 enterprise devices, external devices, and/or admin devices are implemented as one or more computing devices like the computing device 600. It should be appreciated that in other embodiments, the database system 102 enterprise devices, external devices, and/or admin devices are implemented using computing devices having hardware components other than those illustrated in the example of FIG. 6.

The term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Accordingly, in the embodiments contemplated herein, computer storage media includes at least some tangible medium or device. In certain embodiments, computer storage media includes non-transitory media and/or devices. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

In the example of FIG. 6, the computing device 600 includes a memory 602, a processing system 604, a secondary storage device 606, a network interface card 608, a video interface 610, a display unit 612, an external component interface 614, and a communication medium 616. The memory 602 includes one or more computer storage media capable of storing data and/or instructions. In different embodiments, the memory 602 is implemented in different ways. For example, the memory 602 can be implemented using various types of computer storage media.

The processing system 604 includes one or more processing units. A processing unit is a physical device or article of manufacture comprising one or more integrated circuits that selectively execute software instructions. In various embodiments, the processing system 604 is implemented in various ways. For example, the processing system 604 can be implemented as one or more processing cores. In another example, the processing system 604 can include one or more separate microprocessors. In yet another example embodiment, the processing system 604 can include an application-specific integrated circuit (ASIC) that provides specific functionality. In yet another example, the processing system 604 provides specific functionality by using an ASIC and by executing computer-executable instructions.

The secondary storage device 606 includes one or more computer storage media. The secondary storage device 606 stores data and software instructions not directly accessible by the processing system 604. In other words, the processing system 604 performs an I/O operation to retrieve data and/or software instructions from the secondary storage device 606.

In various embodiments, the secondary storage device 606 includes various types of computer storage media. For example, the secondary storage device 606 can include one or more magnetic disks, magnetic tape drives, optical discs, solid state memory devices, and/or other types of computer storage media.

The network interface card 608 enables the computing device 600 to send data to and receive data from a communication network. In different embodiments, the network interface card 608 is implemented in different ways. For example, the network interface card 608 can be implemented as an Ethernet interface, a token-ring network interface, a fiber optic network interface, a wireless network interface (e.g., WiFi, WiMax, etc.), or another type of network interface.

The video interface 610 enables the computing device 600 to output video information to the display unit 612. The display unit 612 can be various types of devices for displaying video information, such as a cathode-ray tube display, an LCD display panel, a plasma screen display panel, a touch-sensitive display panel, an LED screen, or a projector. The video interface 610 can communicate with the display unit 612 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 614 enables the computing device 600 to communicate with external devices. For example, the external component interface 614 can be a USB interface, a FireWire interface, a serial port interface, a parallel port interface, a PS/2 interface, and/or another type of interface that enables the computing device 600 to communicate with external devices. In various embodiments, the external component interface 614 enables the computing device 600 to communicate with various external components, such as external storage devices, input devices, speakers, modems, media player docks, other computing devices, scanners, digital cameras, and fingerprint readers.

The communications medium 616 facilitates communication among the hardware components of the computing device 600. In the example of FIG. 6, the communications medium 616 facilitates communication among the memory 602, the processing system 604, the secondary storage device 606, the network interface card 608, the video interface 610, and the external component interface 614. The communications medium 616 can be implemented in various ways. For example, the communications medium 616 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 602 stores various types of data and/or software instructions. For instance, in the example of FIG. 6, the memory 602 stores a Basic Input/Output System (BIOS) 618 and an operating system 620. The BIOS 618 includes a set of computer-executable instructions that, when executed by the processing system 604, cause the computing device 600 to boot up. The operating system 620 includes a set of computer-executable instructions that, when executed by the processing system 604, cause the computing device 600 to provide an operating system that coordinates the activities and sharing of resources of the computing device 600. Furthermore, the memory 602 stores application software 622. The application software 622 includes computer-executable instructions, that when executed by the processing system 604, cause the computing device 600 to provide one or more applications. The memory 602 also stores program data 624. The program data 624 is data used by programs that execute on the computing device 600.

Overall, a number of advantages of the methods and systems of the present disclosure exist and are described throughout the disclosure. For example, the deadly embrace reporting arrangements provided herein provide an enhanced method of visualizing and detecting deadly embrace conditions, thereby greatly reducing the time required to debug such conditions. Additionally, advantages exist that may not have been explicitly described herein.

The various embodiments described above are provided by way of illustration only and should not be construed as limiting. Those skilled in the art will readily recognize various modifications and changes that may be made without following the example embodiments and applications illustrated and described herein. For example, the operations shown in the figures are merely examples. In various embodiments, similar operations can include more or fewer steps than those shown in the figures. Furthermore, in other embodiments, similar operations can include the steps of the operations shown in the figures in different orders. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for dynamically modifying a database schema of a database, the method comprising:
   receiving, at a database manager managing a database engine operating on a computing system, a request to dynamically modify the database schema of the database;
   completing any pending transactions on the database when the pending transactions were received prior to the request to dynamically modify the database schema;
   upon completion of the pending transactions, causing the database manager to initiate the modification of the database schema of the database based on the received request, the modification of the database schema performed within the confines of the database and requiring recompilation of the database;
   in response to receiving at least one request to access data stored in the database from a device after receiving the request to dynamically modify the database schema and prior to completion of modifying the database schema:
      pausing the at least one request during the recompilation of the database, wherein, from a perspective of the device, the database appears to continue processing the request while the request is paused;
      after completion of modifying the database schema, resuming the at least one paused request;
      identifying a target of the at least one paused request; and
      based, at least in part, on at least one of an addition to the database schema or a deletion from the database schema, determining whether to process the at least one paused request or to generate an alert returned to the device from which the at least one request is received indicating that the target of the request is no longer valid and providing information about the modified database schema, based on whether the target exists subsequent to modification of the database schema due to the modification of the database schema.

2. The method of claim 1, wherein the performing the pending transactions further comprises committing at least one pending transaction.

3. The method of claim 1, wherein performing the pending transactions further comprises performing at least one pending inquiry.

4. The method of claim 1, wherein pausing the at least one request comprises using a semaphore to restrict access to the database.

5. The method of claim 1, wherein pausing the at least one request comprises storing the at least one request in a queue.

6. The method of claim 1, wherein pausing the at least one request comprises using a lock to restrict access to the database.

7. The method of claim 1, wherein the request to dynamically modify the database schema comprises receiving a modified schema, wherein the modified schema is defined using a data definition language.

8. The method of claim 1, wherein modifying the database schema further comprises:
updating database files; and
updating database metadata.

9. The method of claim 8, wherein the database metadata comprises at least one of a configuration file and a catalog file.

10. The method of claim 7, further comprising:
when the target exists, performing the at least one paused request.

11. The method of claim 10, further comprising when the target does not exist, generating an alert.

12. A non-transitory computer storage medium comprising computer-executable instructions, which when executed on a computing device perform a method for dynamically modifying a database schema of a database, the method comprising:
receiving a request to dynamically modify the database schema of the database;
completing any pending transactions on the database wherein the pending transactions were received prior to the request to dynamically modify the database schema;
upon completion of the pending transactions, initiating modification of the database schema of the database based on the received request, the modification of the database schema performed within the confines of the database and requiring recompilation of the database;
in response to receiving at least one request to access data stored in the database from a device after receiving the request to dynamically modify the database schema and prior to completion of modifying the database schema:
pausing the at least one request, wherein, from a perspective of the device, the database appears to continue processing the request while the request is paused;
after completion of modifying the database schema, resuming the at least one paused request;
identifying a target of the at least one paused request; and
based, at least in part, on at least one of an addition to the database schema or a deletion from the database schema, determining whether to process the at least one paused request or to generate an alert to the device from which the at least one request is received indicating that the target of the request is no longer valid and providing information about the modified database schema, based on whether the target exists subsequent to modification of the database schema due to the modification of the database schema.

13. The non-transitory computer storage medium of claim 12, wherein performing the pending transactions further comprises at least one of:
committing at least one pending transaction; and
performing at least one pending inquiry.

14. The non-transitory computer storage medium of claim 12, wherein the method further comprises:
when the target exists subsequent to modification of the database schema, performing the at least one paused request; and
when the target does not exist subsequent to modification of the database schema, generating an alert.

15. The non-transitory computer storage medium of claim 14, wherein the alert comprises information about the modified database schema.

16. The non-transitory computer storage medium of claim 12, wherein pausing the at least one request comprises using a semaphore to restrict access to the database.

17. A system for dynamically modifying a database schema of a database, the system comprising:
a database engine executable on a computing system, the database engine configured to:
receive a request to dynamically modify the database schema of the database;
perform any pending transactions on the database that were received prior to the request to dynamically modify the database schema;
upon completion of the pending transactions, initiate modification of the database schema of the database based on the received request, the modification of the database schema performed within the confines of the database and requiring recompilation of the database;
in response to receiving at least one request to access data stored in the database from a device after receiving the request to dynamically modify the database schema and prior to completion of modifying the database schema:
pause the at least one request, wherein, from a perspective of the device, the database appears to continue processing the request while the request is paused;
after completion of modifying the database schema, resume the at least one paused request;
identify a target of the at least one paused request;
based, at least in part, on at least one of an addition to the database schema or a deletion from the database schema, determine whether the target exists subsequent to the modification of the database schema due to the modification of the database schema;
when the target exists, perform the at least one paused request; and
when the target does not exist, generate an alert to the device from which the at least one request is received indicating that the target of the request is no longer valid and providing information about the modified database schema.

18. The system of claim 17, wherein the database engine is configured to pause the at least one request using a semaphore to restrict access to the database.

19. The system of claim 17, wherein the database engine is configured to perform the pending transactions by at least one of:
  committing at least one pending transaction; and
  performing at least one pending inquiry.

\* \* \* \* \*